United States Patent [19]

Bender et al.

[11] Patent Number: 4,524,671
[45] Date of Patent: Jun. 25, 1985

[54] ANTIFRICTION BEARING FOR LONGITUDINAL DISPLACEMENT GUIDANCE OF A GUN BARREL

[75] Inventors: Rolf Bender, Bad Vilbel; Werner Jacob, Frankfurt am Main; Horst Pfuderer, Dietzenbach, all of Fed. Rep. of Germany

[73] Assignee: INA Walzlager Schaeffler KG, Fed. Rep. of Germany

[21] Appl. No.: 447,506

[22] Filed: Dec. 7, 1982

[30] Foreign Application Priority Data

Dec. 18, 1981 [DE] Fed. Rep. of Germany ....... 3150250

[51] Int. Cl.³ .................... F41F 17/02; F41F 19/00
[52] U.S. Cl. .................... 89/14.05; 89/37.01; 89/37.07; 89/37.14; 308/6 R
[58] Field of Search .............. 42/10, 11; 89/14 R, 89/37 R, 37 E, 37 GM, 177, 178; 308/6 R

[56] References Cited

U.S. PATENT DOCUMENTS

| 1,059,093 | 4/1913 | Völler ........................... 89/37 E |
| 1,383,765 | 7/1921 | Schneider ....................... 89/37 E |
| 4,149,448 | 4/1979 | Kausträter ...................... 89/37 E |

FOREIGN PATENT DOCUMENTS

| 3013988 | 10/1981 | Fed. Rep. of Germany . |
| 1025748 | 4/1953 | France ........................... 384/48 |

Primary Examiner—Deborah L. Kyle
Assistant Examiner—Ted L. Parr
Attorney, Agent, or Firm—Charles A. Muserlian

[57] ABSTRACT

A rolling bearing arrangement for guidance of a gun barrel during longitudinal displacement comprising a gun barrel having at least three circumferential axis-parallel strips projecting radially outward, each strip having two bearing surfaces parallel to each other and to a radial plane, which in turn are associated with directly opposite bearing surfaces extending parallel thereto in a housing surrounding the gun barrel, and a flat cage containing a set of cylindrical rollers arranged between the directly opposite bearing surfaces, the two sets of rollers cooperating with a common strip being under tension by the arrangement, displaceable in a parallel manner, by at least one element carrying a bearing surface.

4 Claims, 3 Drawing Figures

ANTIFRICTION BEARING FOR LONGITUDINAL DISPLACEMENT GUIDANCE OF A GUN BARREL

STATE OF THE ART

The problem of antifriction bearings for longitudinal displacement guidance of gun barrels is that an extremely high degree of accuracy of suspension is required whereby the longitudinal axis of the gun barrel must maintain its exact position when the gun barrel diameter changes due to the temperature increase which occurs when a shot is fired and due to expansion which occurs as a result of the explosion pressure. Also, the suspension must also be capable of withstanding without damage the abrupt acceleration occuring when a shot is fired.

For a long time, the longitudinal displacement guidance of gun barrels has exclusively been effected with sliding or friction bearings wherein the gun barrel was guided in a bearing bushing surrounding the barrel. To ensure that the sliding bearing does not freeze during expansion of the gun barrel when a shot is fired, the bearing had to be given an exceedingly large play which continued to increase during use due to the inevitable wear. Therefore, this construction did not give sufficient accuracy even at the beginning.

Also known is an antifriction bearing wherein the gun barrel is guided on three antifriction-mounted support rollers surrounding the gun barrel and the surface contour of the rollers is adapted to the barrel contour. One of the said rollers is resiliently pressed against the barrel to guide the barrel without play but this antifriction support is insufficient to fulfill the necessary requirements. Such a suspension presents problems when a shot is fired and the support rollers are not in a position to roll off the barrel surface at once due to their relatively large mass and due to the abrupt acceleration occuring. Instead, the barrel at first slides over the surface of the support rollers resulting in undesirable and non-permissable wear. Moreover, there is the danger that with the abrupt acceleration occuring at the time of firing, the one resiliently applied support roller will be pushed away by the barrel counter to its spring load which is limited by the tolerable Hertzian compression of the support roller on the barrel whereby considerable bearing play may occur. Such a construction is illustrated in German DE-OS No. 30 13988.

OBJECTS OF THE INVENTION

It is an object of the invention to provide by relatively simple technical means an antifriction bearing which not only guides a gun barrel without play, but also is entirely slip-free and wear-free because of the small masses to be accelerated.

This and other objects and advantages of the invention will become obvious from the following detailed description.

THE INVENTION

A roller bearing arrangement of the invention for guidance of a gun barrel during longitudinal displacement is comprised of a gun barrel having at least three circumferential axis-parallel strips projecting radially outward, each strip having two bearing surfaces parallel to each other and to a radical plane, which in turn are associated with directly opposite bearing surfaces extending parallel thereto in a housing surrounding the gun barrel, and a flat cage containing a set of cylindrical rollers arranged between the directly opposite bearing surfaces, the two sets of rollers cooperating with a common strip being under tension by the arrangement, displaceable in a parallel manner by at least one element carrying a bearing carrying a bearing surface.

Since the bearing surfaces in this suspension extend exclusively parallel to radial planes, the variations in the gun barrel diameter have no effect whatsoever on the bearing play when a shot is fired. Changes in the gun barrel diameter lead only to a brief, slight relative displacement of the corresponding bearing surfaces without any change in their respective distances which is what determines bearing play. Therefore, the bearing surfaces cooperating with the cylindrical rollers maintain their correct mutual position under all operating conditions. Moreover, since the two antifriction bearings associated with a common strip are set under an initial tension through a suitable design of at least one element having a bearing surface, the antifriction bearing is completely without play initially and even a slight wear of the bearing is acceptable without any position bearing play occuring whereby high firing accuracy is ensured for a long time.

The only structural element of the antifriction bearing subject to high acceleration when a shot is fired is the flat cage containing the cylindrical rollers and if it is uncertain that the flat cage is capable of having this acceleration imparted to it only through the frictional engagement existing in the bearing, means can be provided to positively guide it in a known manner such as by rotatably mounting at the flat cage a gear whose teeth engage two racks, one rack being secured to the one element and the other rack secured to an element carrying a track. A secure and satisfactory guidance of the flat cages can be ensured by this design with hardly any increase in the moved mass of the antifriction bearing.

For adjustment of the desired bearing pretension, the structural element carrying one of two directly opposite tracks may be provided on its side away from the track with a plane surface inclined lengthwise to the track which is supported on a codirectionally inclined surface of the housing and means being optionally provided for longitudinal displacement and fixing of the element relative to the housing.

Referring now to the drawings.

Figure 1:
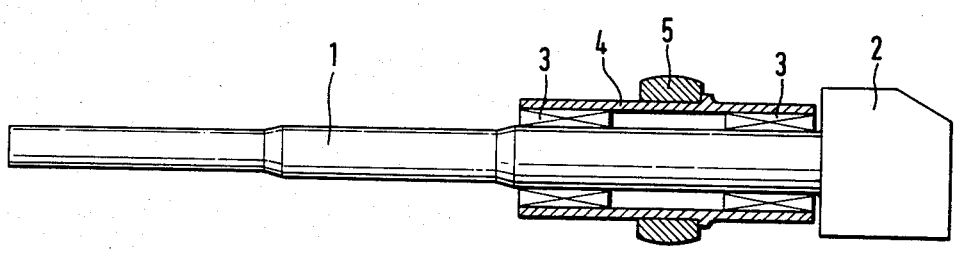
FIG. 1 is a schematic partial longitudinal cross-sectional representation of a gun barrel suspension of the invention.

FIG. 1 shows schematically gun barrel 1 having a three stepped outside diameter with the barrel mouth at the left end and the base plate 2 at its right end. Gun barrel 1 is mounted by means of schematically indicated longitudinal guide bearings 3 in the cradle tube 4, which in turn is secured in the cradle 5. Cradle 5 in turn is mounted in a manner not shown—by means of two lateral pins, to be pivotable so that barrel 1 can be pivoted in the vertical direction.

Figure 2:
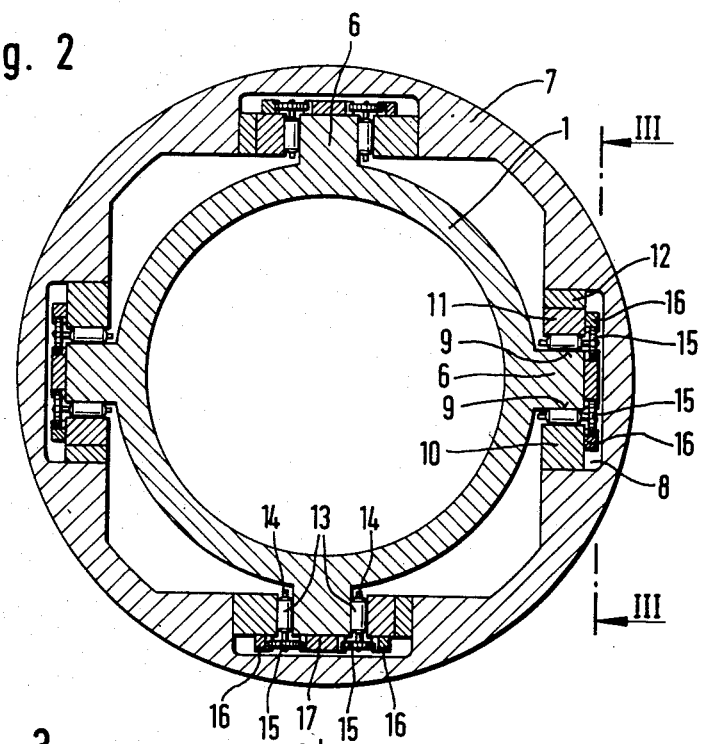
FIG. 2 is a transverse cross-sectional view of the suspension of the embodiment taken along line II—II of FIG. 3.
Figure 3:
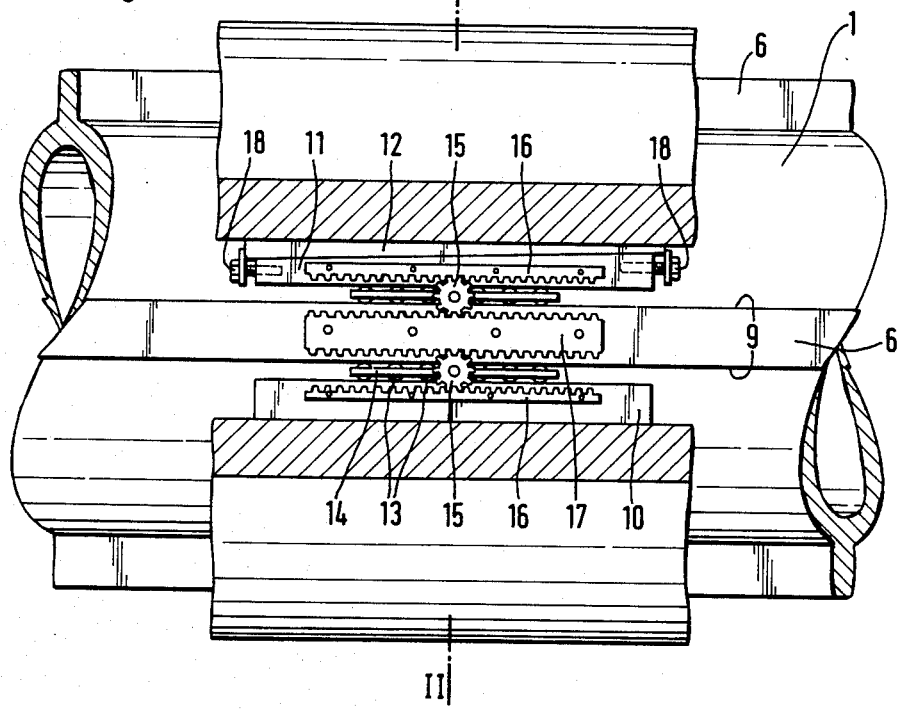
FIG. 3 is a cross-sectional view of the embodiment of FIG. 2 taken along line III—III.

One of the longitudinal guiding bearings 3 indicated schematically in FIG. 1 is illustrated in detail in FIGS. 2 and 3 from which it can be seen that four strips 6 are distributed about the circumference of barrel 1. The barrel is mounted in the housing 7 surrounding it, which may be, for example, the cradle tube. At the circumferential points corresponding to the strips 6, housing 7 has longitudinal grooves 8 matching the bearing surfaces 9 of the strips 6 and in which bearing bars 10 and 11 are arranged. The bars 11 are beveled in wedge form at their faces away from strip 6 and interact at that point with another wedge-shaped bar 12. By longitudinal relative displacement of the bearing bar 11 on the one hand and of the wedge-shaped bar 12 on the other, the bearing bar 11 can be moved toward or away from the respective bearing surface 9 of strip 6 whereby the bearing play can be adjusted.

Cylindrical rollers 13 lodged in a flat cage 14 are arranged between the bearing surfaces 9 of strip 6 and the bearing surfaces parallel thereto provided on the bearing bars 10 and 11. At each of these flat cages 14, a gear 15 is rotatably mounted whose teeth engage into the two mutually opposite racks 16 and 17. The racks 16 are fastened on the bearing bar 10 and on the bearing bar 11, while the racks 17 are fastened to the strips 6 to ensure that upon a relative longitudinal displacement of the bearing surfaces by a certain path, the flat cage travels one half of this path.

For adjustment of the bearing play or respectively of the desired bearing pre-tension, there are provided at the two end faces of the bearing bar 11 threaded bores into which the collar screws 18 are screwed which press by their collars against the end faces of the wedge bar 12. By screwing the collar screws 18 more or less, the bearing bar 11 can be displaced relative to the wedge shaped bar 12 whereby the respective bearing gap increases or decreases. Obviously, the collar screws must be secured against unintentional unscrewing in a suitable manner not shown.

In the example illustrated, four strips 6 are provided on the gun barrel 1, but obviously the suspension of the invention can be realized with at least three such strips. It is further obvious that the part which carries the strips 6 need not necessarily be the gun barrel itself but may instead be sleeves which exchangeably receive the barrel. Likewise, the housing 7 may be either the cradle tube directly, or it may be a separate housing inserted in the cradle tube.

Various modifications of the apparatus of the invention may be made without departing from the spirit or scope thereof and it should be understood that the invention is intended to be limited only as defined in the appended claims.

What we claim is:

1. A rolling bearing arrangement for guidance of a gun barrel during longitudinal displacement comprising a gun barrel having at least three circumferential axis-parallel strips projecting radially outward, each strip having two bearing surfaces parallel to each other and to a radial plane, which surfaces in turn are associated with directly opposite bearing surfaces or elements extending parallel thereto in a housing surrounding the gun barrel, and two flat cages each containing a set of cylindrical rollers arranged between the bearing surfaces of the strip and the directly opposite bearing surfaces of the housing, the two sets of rollers cooperating with each strip being under tension by the arrangement, by at least one of the elements being displaceable perpendicular to the strip.

2. The rolling bearing arrangement of claim 1 wherein each flat cage is positively guided, so that it travels one half of the path of relative longitudinal displacement of the bearing surfaces.

3. The rolling bearing arrangement of claim 2 wherein a gear is rotatably arranged at each flat cage whose teeth engage two racks, one rack being secured to said element and the other rack being secured to the element carrying the directly opposite bearing surface.

4. The rolling bearing arrangement of claim 1, wherein one of the elements is provided on the side away from the bearing surface with a plane surface inclined lengthwise to the bearing surface, the plane surface being supported on a co-directionally inclined surface of the housing, and with means carrying out a longitudinal displacement and securing of the element relative to the housing.

* * * * *